(12) United States Patent
Heiman

(10) Patent No.: US 9,868,865 B1
(45) Date of Patent: Jan. 16, 2018

(54) ZERO/LOW VOC DRY ERASE COATINGS AND OTHER VARIATIONS

(71) Applicant: Michael Heiman, Lee's Summit, MO (US)

(72) Inventor: Michael Heiman, Lee's Summit, MO (US)

( * ) Notice: Subject to any disclaimer, the term of this patent is extended or adjusted under 35 U.S.C. 154(b) by 643 days.

(21) Appl. No.: 14/201,472

(22) Filed: Mar. 7, 2014

Related U.S. Application Data

(60) Provisional application No. 61/774,266, filed on Mar. 7, 2013.

(51) Int. Cl.
| | | |
|---|---|---|
| *C09D 7/00* | (2006.01) | |
| *B05D 3/00* | (2006.01) | |
| *B05D 7/14* | (2006.01) | |
| *B05D 7/06* | (2006.01) | |
| *B43L 1/00* | (2006.01) | |

(52) U.S. Cl.
CPC ............... *C09D 7/00* (2013.01); *B05D 3/007* (2013.01); *B05D 7/06* (2013.01); *B05D 7/148* (2013.01); *B43L 1/00* (2013.01); *B43L 1/002* (2013.01)

(58) Field of Classification Search
None
See application file for complete search history.

(56) References Cited

U.S. PATENT DOCUMENTS

| | | | |
|---|---|---|---|
| 3,365,516 A | 1/1968 | Prescott et al. | |
| 2004/0238116 A1* | 12/2004 | Inoue | C08G 18/10 156/330.9 |
| 2009/0148603 A1* | 6/2009 | Goscha | B05D 5/08 427/256 |

(Continued)

OTHER PUBLICATIONS

Daniel-da-Silva et al, Journal of Applied Polymer Science, 107, pp. 700-709 publsihed online Sep. 25, 2007.*

(Continued)

*Primary Examiner* — Erma Cameron
(74) *Attorney, Agent, or Firm* — Hovey Williams LLP

(57) ABSTRACT

Multi-part and one-part dry erase compositions are disclosed herein, including methods of using such compositions to form low/zero volatile organic compound (VOC) dry erasable coatings. The multi-part dry erase composition comprises a mixture of a first part and a second part, wherein the first part comprises a curable epoxy resin, such as an aromatic epoxide with diglycidyl epoxy functionality, and the second part comprises an amine curing agent, such as cycloaliphatic polyamine. The one-part compositions comprise monomers, oligomers, and polymers of an aliphatic or aromatic isocyanate, such as a diisocyanate, and an amine curing agent, such as morpholine and derivatives thereof. The dry erase compositions have a VOC content of less than about 25 g/L. Dry erasable coatings also include the abilities to dry erase additional markings in addition to dry erase markers, to include, but not limited to, regular marker, permanent marker, pen, highlighter, crayon, and spray paints. The dry erasable coatings can also withstand wet erasing, cleaning, and deep cleaning, with more aggressive cleaning chemicals like acetone, xylene, and Goof-Off brand aerosol cleaner while still maintaining its dry erasable features.

14 Claims, 6 Drawing Sheets
(6 of 6 Drawing Sheet(s) Filed in Color)

(56) References Cited

U.S. PATENT DOCUMENTS

2010/0092671 A1* 4/2010 Goscha ............... B43L 1/00
                                                  427/256
2011/0300294 A1* 12/2011 Nachtman ........... B43L 1/00
                                                  427/189
2013/0029311 A1* 1/2013 Goscha ............. B43L 1/002
                                                  434/408

OTHER PUBLICATIONS

Reichhold Material Safety Data Sheet, Revision Date: Mar. 22, 2011, EPOTUF® 37-143, 6 pages.
Reichhold Product Bulletin, Apr. 2010, EPOTUF® 37-143, 4 pages.
RoyOxy Material Safety Data Sheet, RoyOxy™ RAC-9964, Revised: Aug. 19, 2011, Royce International, 5 pages.
Dow Material Safety Data Sheet, D.E.R. 331 Epoxy Resin, Date Printed: Jun. 30, 2001, 9 pages.
Dow Product Safety, Bisphenol A Diglycidyl Ether, The Dow Chemical Company (1995-2014), 5 pages.
Momentive Technical Data Sheet, Re-issued Sep. 2007, HELOXY™ Modifier 48, 3 pages.
BYK Additives & Instruments Safety Data Sheet, BYK-085, Print Date Jul. 8, 2012, 7 pages.
Material Safety Data Sheet, IdeaPaint Create Clear That (part A), Revision Date Sep. 13, 2012, 7 pages.
Material Safety Data Sheet, IdeaPaint Create Clear This (part B), Revision Date Sep. 13, 2012, 5 pages.
Huntsman Material Safety Data Sheet, JCDMDEE JEFFCAT® DMDEE, Date Printed Apr. 20, 2004, 8 pages.
Tronox Material Safety Data Sheet, Tronox® Titanium Dioxide, All Grades, Revision Date Jan. 30, 2012, 7 pages.
Huber Safety Data Sheet, Hubercarb® Q325, Revision Date: Jun. 17, 2011, 9 pages.
Incorez Material Safety Data Sheet, Incorez 148-604, Date Prepared: Mar. 21, 2011, 4 pages.
Dow Product Information, D.E.R. TM 331 TM, 6 pages.
BYK Additives & Instruments Material Safety Data Sheet, BYK-A 535, Print Date Jan. 5, 2010, 8 pages.
Reichhold Material Safety Data Sheet, AROLON® 5900, Effective Date: Mar. 29, 2006, 6 pages.

* cited by examiner

ZERO/LOW VOC DRY ERASE COATINGS AND OTHER VARIATIONS

CROSS-REFERENCE TO RELATED APPLICATIONS

The present application claims the priority benefit of U.S. Provisional Patent Application Ser. No. 61/774,266, filed Mar. 7, 2013, entitled ZERO/LOW VOC DRY ERASE PAINT AND OTHER VARIATIONS, incorporated by reference in its entirety herein.

BACKGROUND OF THE INVENTION

Field of the Invention

The present invention relates to dry erase coatings having zero or low VOC levels, and other variations.

Description of Related Art

The paint and coatings industry has recently been lowering the VOC (volatile organic compound) content and odor of various coatings for better marketability and installation specification compliance (LEED points and other such considerations). The main players in the field of dry erase paint are Idea Paint, Rustoleum and the labels offering the JML Products and Design products. Existing products have yet to go below the 25 g/L VOC threshold. Both JML Products and Design and Idea Paint have existing products in the 25-150 g/L VOC range.

This innovation will be the first low/zero VOC dry erase product, which is deemed as a major accomplishment in the dry erase paint market due to LEED point advantages and comfort of being around the product during installation and cure times, plus the additional benefits of common end-user errors like using a regular marker or a permanent marker (like Sharpie); or using a stringent chemical when wet erasing, deep cleaning, or accidental spillage or usage on their dry erase surface; plus the benefit of having a dry erase surface available for use without a multiple day waiting period, after installation.

SUMMARY OF THE INVENTION

The present invention is broadly concerned with a method of producing a dry erasable surface. The method comprises providing a dry erase composition having a VOC content of less than about 25 g/L, providing a substrate having a surface, forming a coating of the dry erase composition adjacent the substrate surface, and allowing the coating to cure/dry under ambient conditions. Advantageously, the cured coating has a surface that is markable-erasable. The dry erase composition is selected from the group consisting of multi-part and one-part compositions. The multi-part composition comprises a mixture of a first part and a second part, where the first part comprises a curable epoxy resin and the second part comprises an amine curing agent. The one-part composition comprises monomers, oligomers, and polymers of an aliphatic or aromatic isocyanate, and an amine curing agent.

A dry erasable structure is also disclosed herein. The dry erasable structure comprises a substrate having a surface; and a dry erasable coating adjacent the substrate surface. The dry erasable coating is formed from a dry erase composition selected from the group consisting of multi-part and one-part compositions. The multi-part composition comprises a mixture of a first part and a second part, where the first part comprises a curable epoxy resin and the second part comprises an amine curing agent. The one-part composition comprises monomers, oligomers, and polymers of an aliphatic or aromatic isocyanate, and an amine curing agent. Advantageously, the compositions have a VOC content of less than about 25 g/L.

A dry erase composition is also disclosed herein. The composition is selected from the group consisting of multi-part and one-part compositions. The multi-part composition comprises a mixture of a first part and a second part, where the first part comprises a curable epoxy resin and the second part comprises an amine curing agent. The one-part composition comprises monomers, oligomers, and polymers of an aliphatic or aromatic isocyanate, and an amine curing agent. Advantageously, the compositions have a VOC content of less than about 25 g/L.

A kit for forming a dry erasable surface is also disclosed herein. The kit comprises a first container containing a first part, a second container containing a second part, and instructions for mixing the first part and the second part to form a dry erase composition having a VOC content of less than about 25 g/L, and applying the composition to a substrate to form a dry erasable coating having a dry erasable surface. The first part comprises a curable epoxy resin and the second part comprises an amine curing agent.

In addition to being dry erasable with conventional dry erase writing utensils, the composition coatings are dry erasable with regular markers, permanent markers (Sharpie), crayons, and spray paints. The cured coating surface is also able to double as an anti-graffiti surface, as a protective coating(s) for typical marking utensils and products that cause staining or surface deforming, indoor/outdoor use, and a wet erase (solvent use depending on the marking—water for water-based and the like). The surface is able to handle harsh chemicals like xylene, acetone, and milder solutions like isopropyl alcohol and water to accommodate a variety of cleaning solutions. The product can also be applied to a variety of substrates with or without a priming layer (paint, wood, ceramic, metal, Plexiglas, glass, paper, and woven materials like cloth). The time to a usable, writable surface after application is also under 12 hours (0.25-4 hours in some compositions depending on film thickness, and ambient conditions of humidity and temperature). Additional coats and repairs can be simply applied to itself without the need to scuff, roughen or abrade the surface.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure (FIG. 1 is a photograph of two test coupons coated with the inventive two-part dry erase coating in Example 2, and marked upon using various writing utensils.

DETAILED DESCRIPTION

Figure 1:
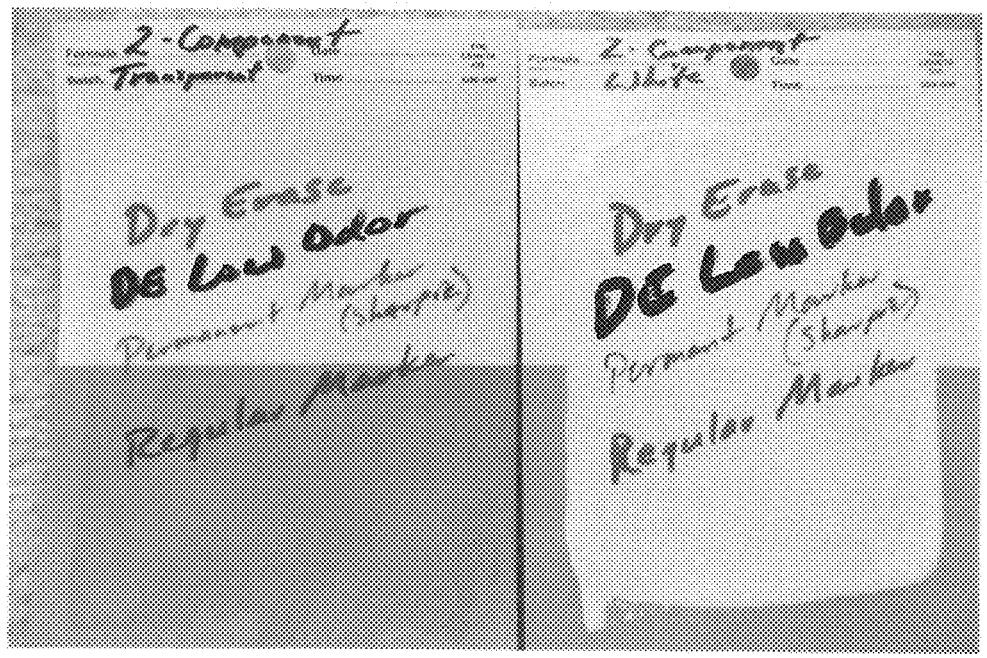

The present invention is concerned with dry erase (i.e., "markable-erasable") coatings, coated substrates, dry erase surfaces, and compositions and methods to produce the same. The inventive compositions are dry erase coating compositions that do not require any special curing techniques, such as photoinitiated (e.g., UV) or heat curing to yield a dry erase surface. The inventive compositions are selected from the group consisting of one-part compositions and multi-part compositions comprising at least a first part (e.g., "A" component) a second part (e.g., "B" component). In one or more embodiments, the multi-part composition consists essentially of a first part of a second part (and optionally a third part), or even consists of the first part and second part.

Multi-Part Compositions

The first part ("A" component) comprises a curable epoxy resin. In one or more embodiments, the first part consists essentially or even consists of a curable epoxy resin. Exemplary epoxy resins suitable for use in the multi-part compositions include epoxy reaction products of phenolic compounds and intermediate epoxide compounds, such as epichlorohydrin. Exemplary epoxy resins include aromatic (and non-hydrogenated) epoxides, which can contain diglycidyl epoxy functionality, and mixtures thereof. The reaction products of bisphenol A and epichlorohydrin (aka bisphenol A diglycidylether) are particularly preferred for use in the invention. Such epoxy systems are commercially available under various tradenames, including EPOTUF (37-143) available from Reichhold, EPON (828, 872, 1001, 1310) from Flexion Specialty Chemicals GmbH in Rosbach, Germany), and DER (331, 332, 334) available from Dow Chemical. Low molecular weight curable epoxy resins are preferred for use in the invention. In one or more embodiments, the curable epoxy resin preferably has a molecular weight of less than about 500 Daltons. Particularly preferred epoxy resin systems have an epoxide equivalent weight of about 180 to about 200, preferably from about 185 to about 195, and more preferably from about 186 to about 193. The epoxide equivalent weight is the weight in grams of resin containing 1 mole equivalent of epoxide (g/mol). The curable epoxy resin is present in the first part in an amount of at least about 50% by weight epoxy resin, preferably from about 85% to about 100% epoxy resin, and more preferably from about 95% to about 100% by weight epoxy resin, based upon the total weight of the first part taken as 100% by weight. Particularly preferred epoxy resins are high solids or 100% solids (i.e., solvent-free, or substantially solvent-free) resin systems.

Non-aromatic and/or hydrogenated epoxy resins are preferably excluded from the multi-part composition as part of either the first or second part (or optional third part). In one or more embodiments, the first part is substantially free of non-aromatic, hydrogenated epoxy resins. In one or more embodiments, the multi-part composition itself is substantially free of non-aromatic, hydrogenated epoxy resins. The term "substantially free" is used herein to indicate that a particular ingredient or component is not present in a significant amount and/or is not purposefully added to impart a certain characteristic to the composition (as contrasted with intentional ingredients mentioned herein), it being understood that incidental amounts of an ingredient may find their way into the composition or be included in such small amounts so as to not affect the overall character of the composition. More specifically, substantially free refers to amounts of less than about 0.01% by weight, preferably less than about 0.001% by weight, and more preferably about 0% by weight, based upon the total weight of the composition or part taken as 100% by weight. In one or more embodiments, the first part is substantially free of siloxane-based or organooxysilane-based epoxy resins. In one or more embodiments, the multi-part composition itself is substantially free of siloxane-based or organooxysilane-based epoxy resins.

The second part ("B" component) comprises, consists essentially of, or even consists of an amine curing agent or hardener for crosslinking/curing the curable epoxy resin. The amines may be aliphatic, cycloaliphatic, or aromatic structures having one or more amino moieties. The preferred amine curing agents include cylcoaliphatic compounds with multiple amine reactive groups, such as cycloaliphatic diamines (e.g., isophorone diamines, and the like). In one or more embodiments, the second part may further comprise a polyamine epoxy adduct (i.e., amine pre-reacted with epoxy resin). The amine curing agent is present in the second part in an amount of from about 50% to about 100% by weight amine curing agent, preferably from about 85% to about 100% by weight amine curing agent, and more preferably from about 95% to about 100% by weight amine curing agent, based upon the total weight of the second part taken as 100% by weight. When present, the polyamine epoxy adduct is present in the second part in an amount of from about 50% to about 100% by weight, preferably from about 85% to about 100% by weight, and more preferably from about 95% to about 100% by weight, based upon the total weight of the second part taken as 100% by weight. Aminosilane-based curing agents are preferably excluded from the inventive multi-part compositions, as part of either the first or second part. In one or more embodiments, the second part is preferably substantially free of aminosilanes. In one or more embodiments, the multi-part composition itself is preferably substantially free of aminosilanes.

Additional ingredients can be included in the multi-part composition as part of the first part, the second part, or a combination thereof. Alternatively, additional ingredients can be provided as a third part (e.g., "C" component). Exemplary additional ingredients include solvent systems, pigments, viscosity reducers, silicone-based levelers and defoaming agents, fluorocarbons, fluoropolymers, solvent-based levelers (e.g., silicones, silica derivatives, polypropylene, secondary curing agents (e.g., crosslinking agents and hardeners), chain extenders, catalysts, surfactants, flame retardants, blowing agents, fillers (calcium carbonate, Hubercarb Q325), and mixtures thereof. Dry agents, such as BYK-A-535 (white oil-based, silicone-free drying agent and defoamer), can also be included, and will also act like defoamers. Examples of secondary curing agents include Incorez 148-604 (waterborne epoxy curing agent) and Arolon 5900 (acrylic polyol emulsion).

In one or more embodiments, the first part further comprises a surfactant, and preferably a nonionic surfactant. When present, the first part comprises surfactant in an amount of from about 0.1% to about 9% by weight, preferably from about 0.2 to about 5% by weight, and more preferably from about 0.5 to about 3.5% by weight, based upon the total weight of the first part taken as 100% by weight. In one or more embodiments, the first part is substantially free of surfactant. In one or more embodiments, the dry erase multi-part composition itself is substantially free of surfactant.

In one or more embodiments, the first part further comprises a viscosity reducer. Particularly preferred viscosity reducers include those that reduce viscosity but retain high epoxide levels in the multi-part composition, and impart hardness and toughness to epoxide polymers. Particularly preferred viscosity reducers may also improve solubility/compatibility characteristics of highly aromatic epoxy systems. Exemplary viscosity reducers include those with multi-functional epoxy functionality, such as trimethylolpropane triglycidyl ether. When present, the first part comprises viscosity reducer in an amount of from about 5% to about 40% by weight, preferably from about 10% to about 30% by weight, and more preferably from about 10% to about 25% by weight, based upon the total weight of the first part taken as 100% by weight. In one or more embodiments, the first part is substantially free of viscosity reducer. In one or more embodiments, the dry erase multi-part composition itself is substantially free of viscosity reducer.

In one or more embodiments, the first part further comprises a leveling agent.

Particularly preferred leveling agents include non-silicon and silicon-based agents that can help increase flowability of the product, reduce runs, and reduce bubble formation (defoam). Polysiloxane levelers such as BYK-085 (available from BYK, Wesel, Germany) are particularly preferred. When present, the first part comprises leveling agent in an amount of from about 0.05% to about 3% by weight, preferably from about 0.1% to about 1% by weight, and more preferably from about 0.1 to about 0.5% by weight, based upon the total weight of the first part taken as 100% by weight. In one or more embodiments, the first part is substantially free of leveling agent. In one or more embodiments, the dry erase multi-part composition itself is substantially free of leveling agent.

In one or more embodiments, the first part further comprises a solvent system.

Exemplary solvents include low-VOC and VOC-exempt solvents, such as water, benzyl alcohol, acetone, alkyl acetates, and mixtures thereof. When present, the solvent system is used in the first part in an amount of from about 5% to about 40% by weight, preferably from about 10% to about 30% by weight, and more preferably from about 20% to about 30% by weight, based upon the total weight of the first part taken as 100% by weight. In one or more embodiments, the first part is substantially free of solvents.

In one or more embodiments, the second part further comprises a solvent system. Exemplary solvents include low-VOC and VOC-exempt solvents, such as water, benzyl alcohol, acetone, and mixtures thereof. When present, the solvent system is used in the second part in an amount of from about 10% to about 60% by weight, preferably from about 20% to about 50% by weight, and more preferably from about 25% to about 50% by weight, based upon the total weight of the second part taken as 100% by weight. In one or more embodiments, the second part is substantially free of solvents. In one or more embodiments, the first part and second part are both substantially free of solvents, such that the dry erase multi-part composition itself is substantially free of solvents. In one or more embodiments, the dry erase multi-part composition is substantially free of non-exempt VOC solvents (e.g., glycol ethers, benzene, formaldehyde, ketones, and the like).

Pigments can be included in the multi-part composition to impart a color to the coating. It will be appreciated that the percentage by weight can vary significantly depending on the level of transparency or opaqueness desired. Exemplary pigments include titanium dioxide, carbon black, and mixtures thereof. In one or more embodiments, the first part further comprises a pigment. When present, the first part comprises pigment in an amount of from about 5% to about 60% by weight, preferably from about 10% to about 50% by weight, and more preferably from about 20% to about 40% by weight, based upon the total weight of the second part taken as 100% by weight. In one or more embodiments, the first part is substantially free of pigment. In one or more embodiments, the second part further comprises a pigment. When present, the second part comprises pigment in an amount of from about 5% to about 60% by weight, preferably from about 10% to about 50% by weight, and more preferably from about 20% to about 40% by weight, based upon the total weight of the second part taken as 100% by weight. In one or more embodiments, the second part is substantially free of pigment. In one or more embodiments, the pigment is added as part of both the first and second part, such that the total pigment in the multi-part composition is from about 5% to about 65% by weight, preferably from about 10% to about 55% by weight, and more preferably from about 20% to about 45% by weight, based upon the total weight of the second part taken as 100% by weight. In one or more embodiments, the dry erase multi-part composition itself is substantially free of pigment.

The first part and second part can be provided in separate respective containers as part of a kit for forming a dry erase surface. Instructions can be included for mixing the first part and second part together. The first part can be provided in a first container and the second part can be provided in a second container. The first part and second part can be mixed together in yet a different container. Alternatively, the first part and second part can be mixed together by pouring one part into the container of the other part.

The dry erase multi-part composition is prepared by thoroughly mixing the first part and second part together (optionally with a third part, if present) under ambient conditions to form, a homogenous mixture. "Ambient conditions" refer to the common prevailing room temperature (65-85° F.), pressure, and relative humidity (60-90%), as opposed to artificial conditions, such as those applied in a vacuum pressure chamber. The respective amounts of the first part and the second part will depend upon the epoxy resin and amine curing agent content in each part, as well as the desired pot life and cure times. For example, other ingredients, such as solvents can be used to extend the pot life of the multi-part composition. Ratios can also be varied to best accommodate various application methods like brush, roller, or sprayer. In general, the first and second parts are mixed together in amounts such that the weight ratio of curable epoxy resin to amine curing agent (inclusive of any polyamine epoxy adduct if present) in the mixture will range from about 1:6 to about 6:1, and preferably from about 1:4 to about 4:1. In one or more embodiments, the mixing ratio can be determined based upon the epoxide equivalent weight of the curable epoxy resin and the amine hydrogen equivalent weight of the amine curing agent. The amine hydrogen equivalent weight is the grams of curing agent containing one equivalent of N-H groups. The theoretical amount of curing agent needed for each 100 g of epoxy resin can be calculated as follows:

$$\text{grams of curing agent} = \frac{100 * \text{amine hydrogen equivalent weight of curing agent}}{\text{epoxide equivalent weight of curable epoxy resin}}$$

Actual amounts used can be slightly modified from this calculated amount, depending upon the final desired performance characteristics of the multi-part compositions. The total solids in the multi-part composition will typically be from about 30% to about 100% by weight, preferably from about 70% to about 100% by weight, more preferably from 85% to about 100% by weight, and even more preferably from about 95% to about 100% by weight, based upon the total weight of the multi-part composition taken as 100% by weight.

One-Part Compositions

In one or more embodiments, the inventive compositions are one-part ("one-pot"), dry erase compositions, which means all ingredients or components of the composition are mixable in a single container without reacting such that the composition has an extended shelf-life even when mixed together, and thus can be provided to the end user as a one component composition in a single container. The inventive one-part compositions have the added benefit of being pre-mixed and ready-to-use for the end user, and do not have to be mixed or prepared on-site, but can simply be applied to the desired substrate to form the dry erase surface.

The one-part compositions comprise (consist essentially or even consist of) monomers, oligomers, and polymers of an aliphatic isocyanate, and particularly a diisocyanate. Exemplary diisocyanates include moisture-cured isocyanates, such as hexamethylene diisocyanate (HDI), hexane diisocyanate, and/or isophorone diisocyanate (IPDI). In some embodiments, aromatic isocyanates may be used, such as toluene diisocyanate (TDI) and/or methylene diphenyl diisocyanate (MDI).

In one or more embodiments, the one-part compositions can further comprise a curing agent or catalyst. Preferred curing agents include dimethyltin dineodecanoate, dibutyltin dilaurate, and amine curing agents. Exemplary amine curing agents include morpholine, and morpholine derivatives, such as 4,4'-(Oxydi-2,1-ethanediyObismorpholine (CAS 6425-39-4) (e.g., JEFFCAT® DMDEE, available from Huntsman Petrochemical Corporation, Houston). In one or more embodiments, the one-part compositions consist essentially or even consist of monomers, oligomers, and polymers of an aliphatic isocyanate, and a morpholine derivative curing agent.

In one or more embodiments, the one-part compositions can further comprise a solvent system. Preferred solvents are VOC-exempt solvents are selected from the group of current EPA (or other agency) listed VOC-exempt solvents, such as water, n-butyl acetate, acetone, alcohols, and mixtures thereof. The level of solvent will be from about 0% to about 5% by weight, preferably from about 1% to about 3% by weight, and more preferably from about 1 to about 1.5% by weight, based upon the total weight of the one-part composition taken as 100% by weight. In one or more embodiments, the one-part composition is substantially free of solvents.

In some embodiments, suitable thickening agents can be included in the one-part compositions, such as polyethyleneglycol distearate, palmiates, oleates, stearates and laurates, as well as vinyl alcohol copolymers and polyvinyl pyrrolidone.

Additional ingredients that can be included in the one-part composition include fluorocarbons, fluoropolymers, silicones, silica derivatives, defoaming agents, polypropylene, crosslinking agents and hardeners, chain extenders, catalysts, surfactants, flame retardants, blowing agents, pigments (e.g., titanium dioxide), fillers, and mixtures thereof. Any of the other additives mentioned above with respect to the multi-part compositions can also be included in the one-part composition. Exemplary crosslinking agents and hardeners include oxazolidines (e.g., Incozol 4), para-toluene sulfonylisocyanate (VanDeMark), silanes, synthetic zeolite (Zeolum CGS IV), synthetic amorphous silica (Gasil 200DF), and the like. Incozol 4 is a bis-oxazolidine latent hardener that hydrolyzes on exposure to moisture, yielding a reactive amine and hydroxyl functional cross-linking agent. It also confers tolerance to repeated opening of containers. Incozol 4 also acts as a moisture scavenger and drying agent, and is a particularly preferred hardener. It can be used at levels up to about 25% by weight, based upon the total weight of the one-part composition taken as 100% by weight. Silanes, synthetic zeolite (Zeolum CGS IV), synthetic amorphous silica (Gasil 200DF) could also be used in lieu of or in addition to Incozol 4.

Leveling agents can also be included in the composition, including silicon-based agents that can help increase flowability of the product, reduce runs, and reduce bubble formation (defoam). Polysiloxane levelers such as BYK-085 (available from BYK, Wesel, Germany) are particularly preferred. In one aspect, the leveling agent is used in an amount of from about 0% to about 5% by weight, preferably from about 0.01% to about 1% by weight, and more preferably from about 0.1 to about 0.5% by weight, based upon the total weight of the one-part composition taken as 100% by weight. In one or more embodiments, the one-part composition is substantially free of leveling agent.

Pigments can be included in the one-part composition to impart a color to the coating. Exemplary pigments include titanium dioxide, carbon black, and mixtures thereof. When present, the one-part composition can comprise pigment in an amount of from about 1% to about 50% by weight, preferably from about 5% to about 30% by weight, and more preferably from about 10% to about 20% by weight, based upon the total weight of the one-part composition taken as 100% by weight. It will be appreciated that the percentage by weight can vary significantly depending on the level of transparency or opaqueness desired. In one or more embodiments, the one-part composition is substantially free of pigment. In other words, in some embodiments the one-part composition is substantially transparent or clear.

In one or more embodiments, the one-part composition is substantially free of epoxies, including siloxane-based or organooxysilane-based epoxy resins. In one or more embodiments, the dry erase one-part composition is substantially free of non-exempt VOC solvents (e.g., glycol ethers, benzene, formaldehyde, ketones, and the like). In one or more embodiments, the one-part composition is substantially free of aminosilanes.

The one-part composition is prepared by mixing the ingredients together. If the isocyanate is in liquid or gel form, the one-part composition can be prepared by simply mixing together all of the ingredients until a homogenous composition is formed. If the isocyanate is in a solid or semisolid form, it can he heated to liquefy the resin, followed by mixing in the remaining ingredients until substantially blended together in a homogenous composition. In some aspects, the isocyanate is heated to a temperature of from about 150 to about 200° F., more preferably from about 160 to about 190° F., and even more preferably from about 175 to about 185° F. to liquefy the base before mixing with the remaining ingredients, based upon the amount and density of the isocyanate component. The total solids in the one-part composition will typically be from about 30% to about 100% by weight, preferably from about 50% to about 100% by weight, and more preferably from 85% to about 100% by weight, and even more preferably from about 95% to about 100% by weight, based upon the total weight of the one-part composition taken as 100% by weight.

In some embodiments, a drying agent may be added to the composition to remove excessive moisture from the composition (added from solvents in the resin, or pigment). Drying agents that can also be included are sulfonyl isocyanates (e.g., Para-Toluenesulfonyl Isocyanate (PTSI)). The amount of drying agent to be used will depend on the amount of moisture to be scavenged (e.g., from additives), etc. For example, they can be used at levels up to about 5% by weight, and preferably up to about 2% by weight, based upon the total weight of the one-part composition taken as 100% by weight.

The one-part composition once mixed can be stored in an appropriate container sealed under vacuum or capped with an inert gas (e.g., nitrogen) to maintain its shelf-storage stability and inhibit reaction with ambient moisture in the air: The one-part composition will have an unopened shelf-life of at least about 3 months, preferably at least about 6 months, and more preferably at least about 12 months. The term "shelf-life" refers to the length of shelf-storage stability of the one-part composition after which it can still be used to create the dry erase coatings. For best shelf-life, the one-part product should be stored at 40-50% humidity, with stable temperatures from 50° F. to 95° F. Longer shelf life can be attained by placing the one-part composition is a non-reactive pliable container, such as a polypropylene (#5) bag, removing all or most air, and securing the container closed. Other methods of extending shelf life include vacuuming out the air in the container, capping with an inert gas (like nitrogen) or repackaging into a container close to the remaining volume, thereby reducing humidity moisture in the headspace of the container. Once opened, and then resealed the shelf-life of the resealed one-part composition will be at least about 1 month, preferably at least about 6 months, and more preferably about 12 months, depending upon the resealing technique used (i.e., the amount of air evacuated from the container before resealing). Advantageously, a top layer in the container may become hardened, but once removed, will allow the remaining un-solidified portions of the one-part composition to be used.

Characteristics and Use of One-Part and Two-Part Compositions

In some embodiments, the compositions are substantially free of photoinitiators, conditioners, primers, and the like.

The compositions are advantageously low or zero VOC content products, with little or no discernible odor or noxious smells. The actual VOC content of the compositions will vary depending on the methodology used to calculate the VOC content. Certain regions (places like Southern CA and New Jersey) have more restrictive calculation constraints resulting in a higher VOC calculation; whereas, the remaining regions (most of the United States) have less restrictive calculation constraints resulting in a lower VOC calculations for the same product. Some solvents are exempt from the calculation. In the context of the present application, VOC content is calculated using U.S. EPA Reference Method 24 (M24). Generally, M24 is the accepted standard for VOC testing for all surface coatings, lubricants, cleaning materials and some inks. M24 determines the VOC content of a coating by measuring the water, exempt compound, and non-volatile fractions, with the remainder calculated as VOCs. When calculated pursuant to M24, the VOC content of the coatings will advantageously be less than about 25 g/L, preferably about 21 g/L or less, and more preferably from about 0 to about 21 g/L. With respect to the multi-part compositions, the VOC is calculated based upon VOC content of the mixture of the first and second (and option third) parts.

In use, the pot-life of the multi-part composition, once mixed, will range from about 10 to about 90 minutes, preferably from about 15 to about 60 minutes, and more preferably from about 20 to about 45 minutes. It will be appreciated that pot-life times can vary depending upon the additives used in the multi-part composition, as well as the ambient temperature and humidity conditions. The pot-life times will also vary depending on the remaining depth of the multi-part mixture in the container (i.e., the thicker the multi-part composition, the more heat that is retained thereby accelerating the curing and shortening the pot life). The "pot-life" (aka "working life" or "gel time") refers to the length of time, measured from the time of mixing the first part and second part (and optional third part) together, that the dry erase multi-part composition remains useable to form a dry erase coating. Too long of a pot life can result in varying curing times and viscosity of the product being applied; too short of a pot life can result in not having enough time to apply the product to the surface before the product becomes unappliable. Both compositions are thermosetting and cannot be reversed to a useable state once the pot life has expired or the composition has cured.

In use, the composition is applied to a substrate surface. Suitable substrates include any horizontal, vertical, planar, or non-planar shaped surface to which a coating can be applied. The substrate may be comprised of various materials, or may be coated with various materials including wood, Plexiglas™, dry wall, painted surfaces, plastic, glass, melamine coatings (including existing dry erase surfaces), metal, slate, porcelain, ceramic, concrete, masonry, enameled surfaces, composites, woven and non-woven fabrics, and the like. For example, the inventive dry erase coating can be applied to surfaces such as floors, walls, ceilings, desktops, dry erase boards, chalkboards, windows, furniture (e.g., refrigerators, cabinets, etc.) extruded plastic shapes, concrete blocks, bricks, and the like. Advantageously, the substrate does not need to be primed, sanded, or otherwise roughened or prepped before applying the coating compositions, although such preparation can help the coating better adhere to the substrate surface. In one or more embodiments, the substrate surface is prepared by painting with a latex paint or primer. The compositions can be applied using any suitable technique, including rolling, brushing, spraying, dipping, pouring, dragging, or pulling the compositions onto and over the substrate surface (or intermediate layer of paint, primer, etc.), and the like. In some embodiments, the compositions are applied at a rate of from about 3 oz/ft² for a single coating to produce even coverage while maximizing product usage. Multiple coats can be used to achieve the desired level of thickness. The number of coats required will depend upon the particular formulation used and the level of evaporation of the solvents utilized (if any), as well as the thickness of each coat applied, the porousness, and texture of the substrate. In some embodiments, 1 to 3 coats are used, although 2 to 3 coats may be used. For example, 3 ounces of the composition will cover about 1 square feet in one coat.

In some cases, if the drying or curing is very quick on the top of the coating, yet slower on the bottom of the coating a thinner coating may be used to eliminate bubbling or other undesirable coating imperfections during curing of the layer. In such case, subsequent coats may be needed to achieve the desired final thickness of the dry erase paint. If the curing rate allows the product to cure without forming bubbles or surface variations, then a single coat can be applied. In some aspects, it may be desirable to seal the substrate surface using a very thin initial coating of the dry erase compositions followed by subsequent coats to form the dry erase coating. In any event, the final coating thickness will be sufficiently thick to keep markings from penetrating down into the substrate. In some aspects, the final average thickness will range from about 1 mL to about 6 mL, preferably from about 2 mL to about 5 mL, and more preferably from about 3 mL to about 4 mL.

The viscosity of the compositions is balanced so that it does not drip or sag when applied on a vertical surface, even with multiple coats, but also does not dry too quickly. It is also self-leveling and will planarize slight imperfections in the substrate surface. The cured coating is abrasion resistant, chemical resistant, and resistant to staining and ghosting from permanent markers, inks, and/or paints, and the like.

The coating is allowed to dry and cure without any special curing treatments or application of additional coatings (such as conditioners or the like). In other words, UV or heat curing is not used, and the coating is dried and cured under ambient conditions. Once cured, the coating is characterized by a surface that is markable-erasable, which means that it can be marked upon with a writing utensil (e.g., marker), wherein the marking is removable without use of water, other solvents or cleaning agents, such that substantially no residual pigment, ink, paint, etc. remains visible on the coating surface when wiped dry. In other words, the markings are "dry-removable." In addition, a top coat is not necessary to achieve the markable-erasable surface. In some aspects, the coating will be suitable for marking about 15 minutes after application of the last coating layer. In some aspects, the coating will be suitable for marking about 72 hours after application of the last coating layer. It will be appreciated that the cure time required to achieve the markable-erasable property of the coating surface will depend to a certain extent on the type of marking instrument desired to be used. For example, dry erase markers are typically dry-removable if applied after about 4 to about 72 hours of curing, while permanent marker, spray paint, and conventional markers are dry-removable after allowing the coating to cure for about 3 to about 7 days.

In some aspects, it may be desirable to infuse a permanent image or marking onto the coating. In this case, the coating can be marked upon during curing before being fully cured. Such a marking will become a permanent part of the dry erase surface, and can be achieved using direct writing, ink transfers, or the like. Typically, the infused marking is achieved by marking on the coating surface about 10 minutes to about 1 hour after applying the coating (while the coating is still tacky). Alternatively, the permanent image can be created on the substrate surface before coating with transparent dry erase composition.

The inventive coatings are markable-erasable (removable) with a variety of marking instruments, including dry erase markers and pens, felt tip pens, permanent markers, crayons, highlighter markers, washable markers, regular markers, pencils (e.g., lead pencils, graphite pencils), paints (e.g., spray paint, finger paint), make-up (e.g., lipstick), pens (e.g., grease pens, gel pens, ink pens), grease pencils, as well as adhesives such as glue, tape, and stickers. The term's "dry erase," "dry erasable," "dry-removable," "markable-erasable," and the like, are used herein to refer to the cured coating's surface property of being markable or writeable with typical writing and marking instruments to create words, letter, images, and the like, but such writings and markings can be removed from the coating surface without the use of water, other solvents, cleaners or other "wet" removal methods (i.e., can be removed simply by wiping with a dry cloth, felt eraser, paper towel, rag or the like). Dry wiping of the marking, without applied solvents, leaves substantially no visible residual pigment, ink, paint, etc. on the surface. In other words, the marking is substantially completely removed without staining or ghosting (faintly visible remnant of the marking left on the surface). This attribute is attainable but can be diminished by varying the formulation when other features are sought.

The cured coatings are also resistant to various solvents and cleaners that may be used on the dry erase coating surface, including water, other aqueous solutions, glass cleaner (Windex®, aqueous solution of isopropanol and ethyleneglycol monohexylether), isopropyl alcohol, xylene, and acetone (as found in products like Goof-Off®), and other such chemicals and cleaners. Thus, unlike conventional dry erase boards, such cleaners can be used to clean and remove any persistent or unknown markings that may get on the inventive dry erase coating. Advantageously, even alter cleaning or otherwise contacting the cured dry erase coating with such cleaners, the surface of the inventive coating will maintain its markable-erasable attributes.

The inventive coatings also have the appropriate balance of softness (flexibility) versus hardness (non-poracity). In particular, the coatings are not so soft that an eraser or cleaning cloth drags on the surface, inhibiting a smooth erasing experience. However, the coatings are also not too hard such that they crack or create a cracked image. In one or more embodiments, the coatings have a Shore hardness of about 82. The inventive coatings can be formulated as either glossy or with a flat sheen depending upon the additives. For example, dullers, powders, and/or granules, can be added to the composition (as part of the first or second part, or option third part) to achieve a semi-gloss or matte finish.

In some embodiments, the inventive coatings can further comprise pigments or dyes, such as titanium dioxide, carbon black, and the like. Depending upon the level of pigment, the coatings can range from substantially opaque (% transmittance of less than about 10% and preferably about 0%) to translucent (% transmittance ranging from 10% to 70%).

In some aspects, the inventive coatings are substantially transparent, which means that they have a % light transmittance of at least about 70%, preferably at least about 80%, and more preferably at least about 90% in the visible range (400-700 nm). Accordingly, such coating compositions are substantially free of pigments, dyes, or other colorants. Thus, the inventive coatings can be applied over existing painted surfaces to create markable-erasable surfaces of virtually any color, or with images underneath, including, for example, graph lines, logos, other graphics, and the like. For a freshly painted surface, the inventive coatings are advantageous because they have sufficient porosity to allow the underlying non-dry erase paint layer to off-gas through the dry erase layer so that it cures correctly and does not adversely affect the dry erase layer. However, as noted above, the porosity is balanced so that the dry erase layer provides a sufficient barrier between the substrate surface to avoid permanent marking of the substrate.

The inventive coatings are also easily repairable. This means that any defects or damage in the coating can be easily repaired by simply applying one or more coatings of the inventive paint to the damaged portion, and does not require the damaged portion to be primed, or sanded before making the repair, although such preparation techniques may improve the look of the repair.

Other variations include adding phosphorous to create glow-in-the-dark dry erase products, aluminum to create a metallic look, adding magnetic receptive metals to create a magnetic dry erase paint, adding silicone or other surface variation additives and methods. These additives, and other additives like color, can be added at the time of production (to the first or second part) or added by the consumer (i.e., added to the mixture of the first part and second part). Due to the ability of the product to repel staining by permanent markers and spray paints, the product can also be used as anti-graffiti paint or as a surface protectant.

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLES

The following examples set forth methods in accordance with the invention. It is to be understood, however, that these examples are provided by way of illustration and nothing therein should be taken as a limitation upon the overall scope of the invention.

Example 1

Dry Erasable Coatings

The initial mixing of the product was just the two components without any additives at a 2.5:1 ratio. It cured within 5 minutes (pot-life). Although the product had installation issues (too short pot-life) and appearance issues (not smooth or consistent), the product was dry erasable in a zero VOC format. Water was then added into the formula to create a longer pot life and slow down the reaction time. The mix described has a pot-life of about an hour with dry erase writeability being in less than 12 hours. Additives like a leveler and defoamer were also added, 1-3% by weight, to create a better looking dried product without compromising dry erase performance. Over a series of tests, a 4:1 ratio proved advantageous for product image when cured but the product remained liquid in the pot after the usable pot-life. A 3.25:1 ratio produced a product that would harden in the pot in a timely manner without losing too many attributes. Two-Component Water-Based Formulations

| | Formula: | | | | | | |
|---|---|---|---|---|---|---|---|
| | Epoxy White 3.5:1 | | | Epoxy Clear 3:1 | | | |
| RM | Specific Gravity | # In formula (IF) | Gal IF | RM | Specific Gravity | # In formula | Gal IF |
| | Part B: | | | | | | |
| Amine curing agent[1] | 1.007 | 8.400 | 1.000 | Amine curing agent[1] | 1.007 | 8.400 | 1.000 |
| | Part A: | | | | | | |
| Epoxy resin[2] | 1.127 | 23.352 | 2.484 | Epoxy resin[2] | 1.127 | 23.352 | 2.484 |
| H$_2$O | 1.000 | 3.140 | 0.376 | H$_2$O | 1.000 | 4.300 | 0.516 |
| Pigment[3] | 1.970 | 10.500 | 0.639 | — | | | |
| Totals: | | 45.392 | 4.500 | | | 36.052 | 4.000 |

[1]RoyOxy™ RAC-9964, cycloaliphatic amine curing agent, containing epoxy polyamine adduct, isophoronediamine, benzyl alcohol, and cresol, available from Royce International (East Rutherford, NJ).
[2]EPOTIF® 37-143, aqueous dispersion of diglycidyl ether of bisphenol A homopolymer, including 1-5 wt % nonionic surfactant (proprietary), available from Reichhold, Inc., Research Triangle Park, NC.
[3]ZVOC 1139, titanium dioxide color dispersion from Cardinal Color, Paterson, NJ.

Two-Component, 100% Solids, 0% VOC

Formula:

| | Epoxy Clear 2A:1B | | | | Epoxy White 2A:1B | | |
|---|---|---|---|---|---|---|---|
| RM | Specific Gravity | # In formula (IF) | Gal IF | RM | Specific Gravity | # In formula | Gal IF |
| | | | Part B: | | | | |
| Amine curing agent[1] | 1.007 | 50.8 | 6.049 | Amine curing agent[1] | 1.007 | 51.18 | 6.049 |
| | | | Part A: | | | | |
| Epoxy resin[2] | 1.16 | 100 | 10.337 | Epoxy resin[2] | 1.16 | 85 | 8.786 |
| Viscosity reducer[3] | 1.15 | 15 | 1.564 | Viscosity reducer[3] | 1.15 | 15 | 1.564 |
| Leveler[4] | 0.904 | 0.3 | 0.04 | Pigment[5] | 4.12 | 47 | 1.368 |
| Totals: | | 166.1 | 17.989 | | | 198.18 | 17.812 |

[1]RoyOxy™ RAC-9964, cycloaliphatic amine curing agent, containing epoxy polyamine adduct, isophoronediamine, benzyl alcohol (25-50%), and cresol, available from Royce International (East Rutherford, NJ).
[2]DER 331, 100% solids reaction product of epichlorohydrin and bisphenol A (aka, diglycidyl ether of bisphenol A), available from DOW Chemical, Midland, MI.
[3]Heloxy™ Modifier 48, low viscosity aliphatic triglycidyl ether, available from Momentive, Columbus, OH.
[4]BYK-085, polymethylalkylsiloxane, leveler and defoaming agent, available from BYK-Chemie GmbH, Wesel, Germany
[5]Titanium dioxide pigment

Example 2

Dry Erasable Coatings

Two-component, 100% solids, dry erasable coatings were prepared by mixing Part A with Part B. Transparent (clear) and white coatings were prepared, with white coatings including a titanium dioxide pigment.
Part A (Epoxy Resin):
Reaction product of epichlorohydrin
& bisphenol A 70-90 wt %
Trimethylol propane triglycidyl
ether 15-25 wt %
Pigment (if colored) 20-40 wt %
Part B (Hardener-Polyamine Curing Agent):
Polyamine Epoxy Resin Adduct 10-30 wt %
Isophorone Diamine 20-40 wt %
Benzyl Alcohol 25-50 wt %
Cresol <3 wt %
Pigment (if colored)<18 wt %
VOC Content, as calculated using EPA Method 24: less than 25 grams/liter.

Part A and Part B were mixed in a 2:1 ratio under ambient conditions (65-85° F. and relative humidity below 85%). The resulting mixture has a viscosity of from about 700-1,000 cps under ambient conditions. The mixture has a pot life of about 30-35 minutes.

The two-part composition was applied to test coupons to form a dry erasable coating. The test coupons had divided white and gray sections. The gray sections were visible through the clear coating, while the white (opaque) coating covered the gray sections, blocking the gray color. The coating was tack-free after about 4 hours of dry time under ambient conditions. The coating can be recoated or top coated, if desired, after about 6 hours, The coating was allowed to dry and cure for about 72 hours under ambient conditions until markeable-erasable with a conventional dry erase writing instrument. After 72 hours, the coating was also resistant to 70% isopropyl alcohol and water solvents. The coating was allowed to dry and cure for about 7 days under ambient conditions until markeable-erasable with permanent markers and spray paint. After 7 days, the coating was also resistant to acetone, Goof Off, and xylene solvents.

Figure 2:
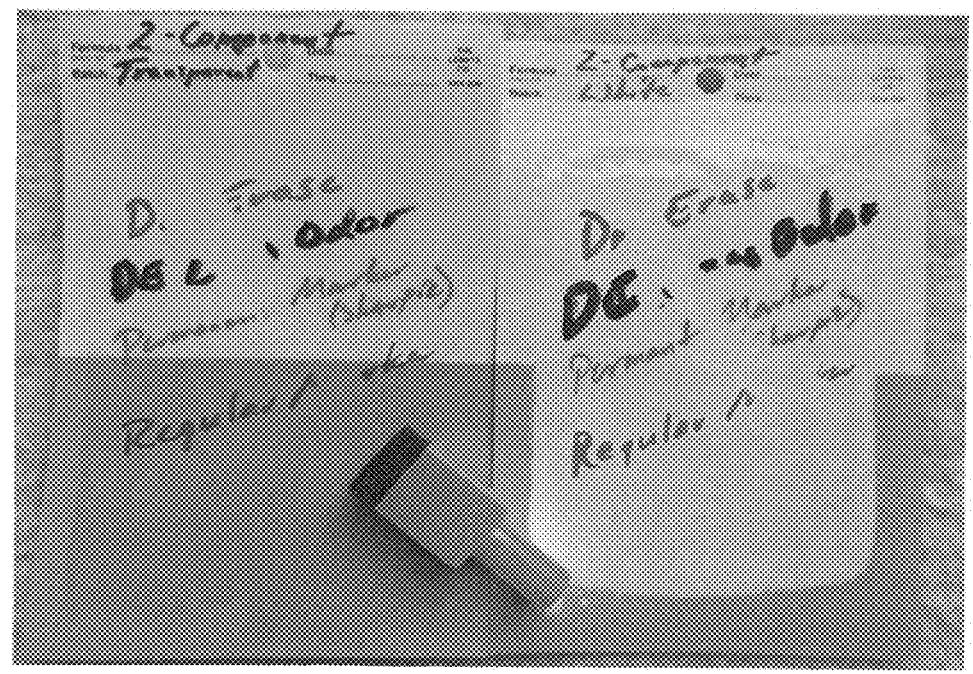
FIG. 2 is a photograph of the two test coupons in FIG. 1 after removal of a portion of the marking using a dry eraser, without any solvent.
Figure 3:
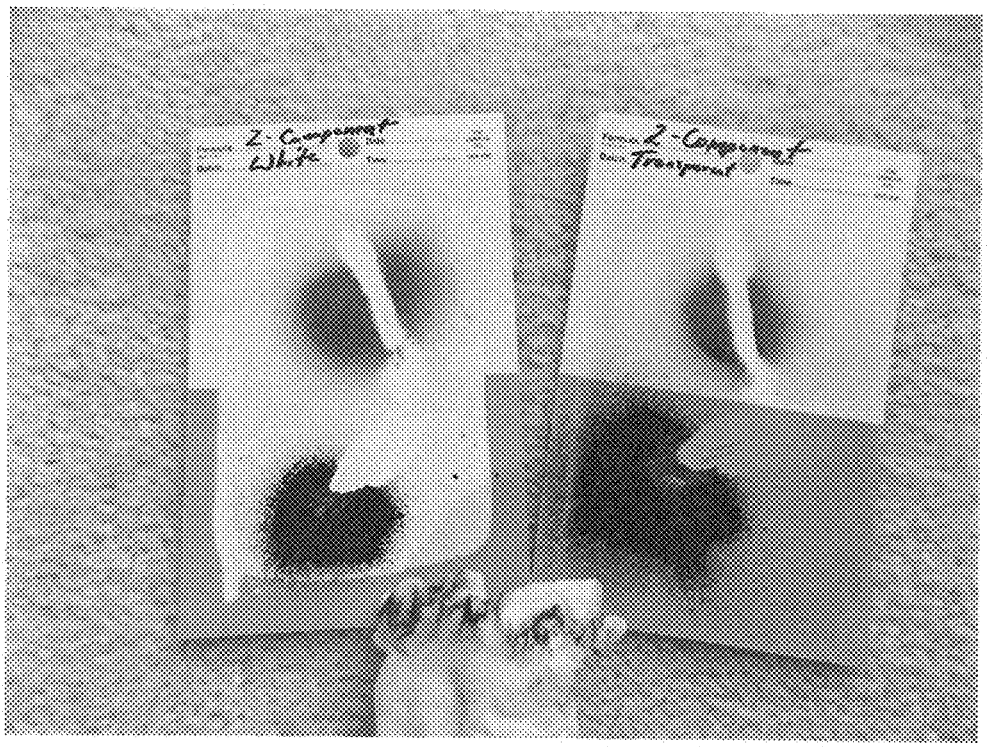
FIG. 3 is a photograph of two test coupons coated with the inventive two-part dry erase coating in Example 2, marked upon with spray paint, and then partly removed using a dry paper towel.
Figure 4:
FIG. 4 is a photograph of the two test coupons in FIG. 3, with further removal of the spray paint using isopropyl alcohol (70%)
Figure 5:
FIG. 5 is a photograph of the two test coupons in FIG. 3, with further removal of the spray paint using aerosol Goof Off.
Figure 6:
FIG. 6 is a photograph of two test coupons coated with the inventive two-part dry erase coating in Example 2, that have been cleaned using isopropyl alcohol (70%) and Goof Off (aerosol can), followed by marking the surface with a dry erase marker to demonstrate resistance of the coating to cleaning solvents, and maintenance of the dry erase attributes of the coatings after cleaning.

The test coupons were marked upon using various writing utensils and markings, which were subsequently removed. The test coupons coated with the dry erase coating (both transparent and white) were first marked on using different writing utensils: dry erase marker (@office); low odor dry erase marker (Expo®); permanent marker (Sharpie®); and regular, non-permanent marker. These results are shown in FIG. 1. FIG. 2 shows removal of these markings using a conventional dry eraser only, and no solvent. FIG. 3 shows the coupons marked upon using spray paint, followed by removal using a dry paper towel. FIG. 4 shows removal of the spray paint using isopropyl alcohol (70%) and FIG. 5 shows removal using aerosol Goof Off™. FIG. 6 shows the coupons after removal of markings and cleaning of the dry erase coating using isopropyl alcohol (70%) and Goof Off™ (aerosol can), followed by marking the cleaned surface with a dry erase marker. This demonstrates resistance of the coating to cleaning solvents.

The cured coatings have a Shore hardness D of about 82, a Gloss of >70 at 60 degrees using an Erichsen glossmeter, a flexural strength of 10,120 psi under ASTM D790, a tensile strength of 6,550 psi under ASTM D638, and a compressive strength of 9,440 psi under ASTM D695-½"×½" bars.

Example 3

One-Pot Dry Erasable Coatings

One-part, dry erasable coating compositions were formulated according to the tables below. Transparent (clear) and white coatings were prepared, with white coatings including a titanium dioxide pigment, as well as a drying agent and solvent.
One-Part Transparent Composition

| RM | Specific Gravity | # In formula (IF) |
|---|---|---|
| Hexane 1,6 Diisocyanate 50% (CAS 822-06-0) Poly (Hexamethylene Diisocyanate) 50% (CAS 28182-81-2) | 1.17 | 67.75 |

-continued

| RM | Specific Gravity | # In formula (IF) |
|---|---|---|
| Incozol 4[1] | 1.07 | 32 |
| Leveler[2] | 0.904 | 0.25 |
| | | 100 |

[1]Incozol 4 is a bis-oxazolidine latent hardener that hydrolyzes on exposure to moisture, yielding a reactive amine and hydroxyl functional cross-linking agent. It also confers tolerance to repeated opening of containers. Incozol 4 also acts as a moisture scavenger and drying agent, and is a particularly preferred hardener.
[2]BYK-085, polymethylalkylsiloxane, leveler and defoaming agent, available from BYK-Chemie GmbH, Wesel, Germany One-Part White Composition

| RM | Specific Gravity | # In formula (IF) |
|---|---|---|
| Hexane 1,6 Diisocyanate 50% (CAS 822-06-0) Poly (Hexamethylene Diisocyanate) 50% (CAS 28182-81-2) | 1.17 | 52.75 |
| Incozol 4 | 1.07 | 25.1 |
| Pigment[1] | 4.12 | 20 |
| Leveler[2] | 0.904 | 0.1 |
| N. Butyl Acetate | 0.885 | 1.0 |
| Drying agent[3] | 1.06 | 1.05 |
| | | 100 |

[1]Titanium dioxide.
[2]BYK-085.
[3]Para-Toluenesulfonyl Isocyanate (PTSI), a sulfonyl isocyanate, designed to remove residual moisture.

VOC Content, as calculated using EPA Method 24: 150 grams/liter.

The formulations were applied to test coupons to form a dry erasable coating. The test coupons had divided white and gray sections. The gray sections were visible through the clear coating, while the white (opaque) coating covered the gray sections, blocking the gray color. The coating surfaces were dry erasable with a dry erase marker within 1 hour or less of curing. After 12 hours of curing, the coating surface was also resistant to 70% isopropyl alcohol. After 3 days of curing, the coating surface was markable/erasable with permanent marker using 70% isopropyl alcohol, acetone, or Goof-off.

Figure 7:
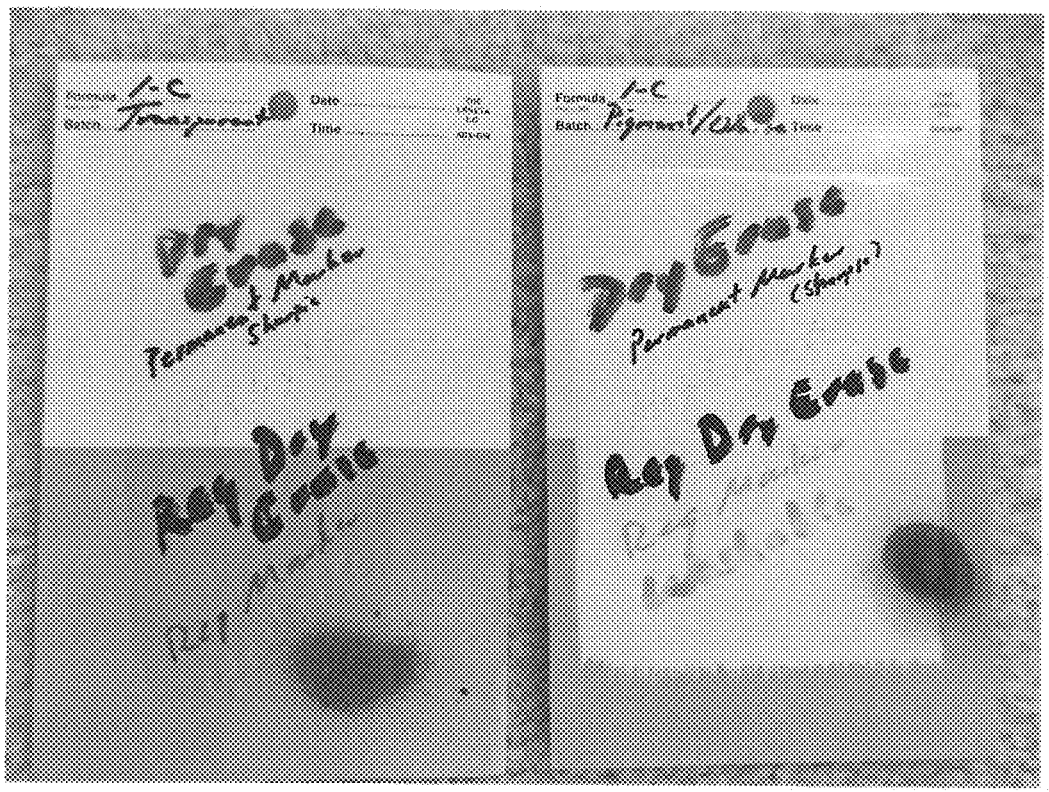
FIG. 7 is a photograph of two test coupons, coated with the inventive one-part dry erase coating in Example 3, and marked upon using various writing utensils.
Figure 8:
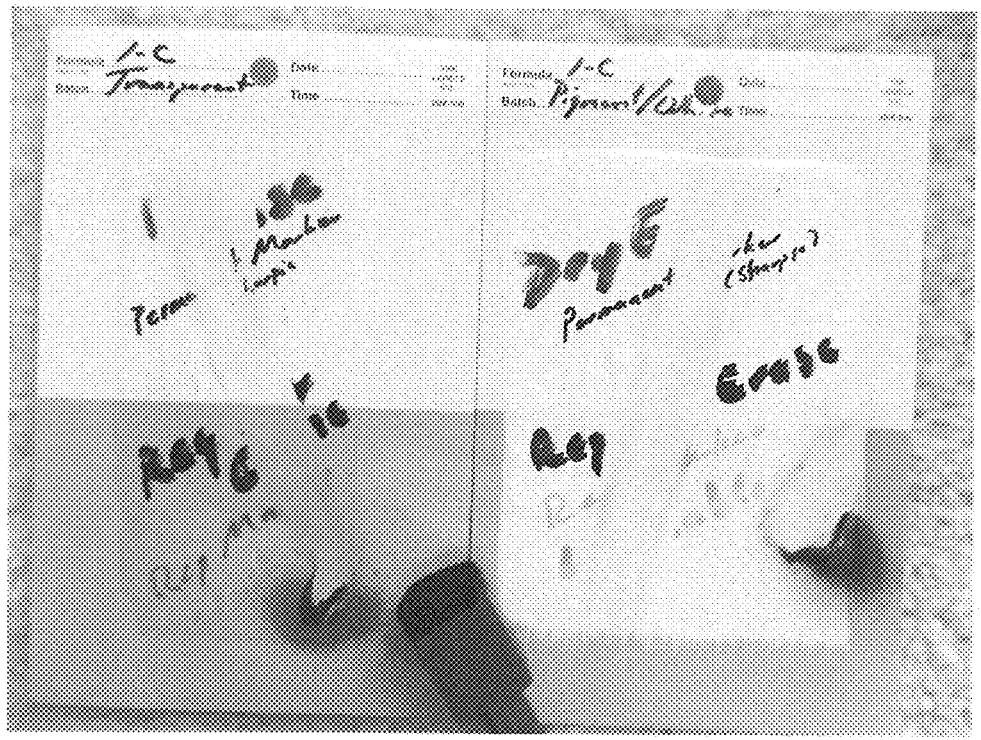
FIG. 8 is a photograph of the two test coupons in FIG. 7 after removal of a portion of the marking using a dry eraser, without any solvent.
Figure 9:
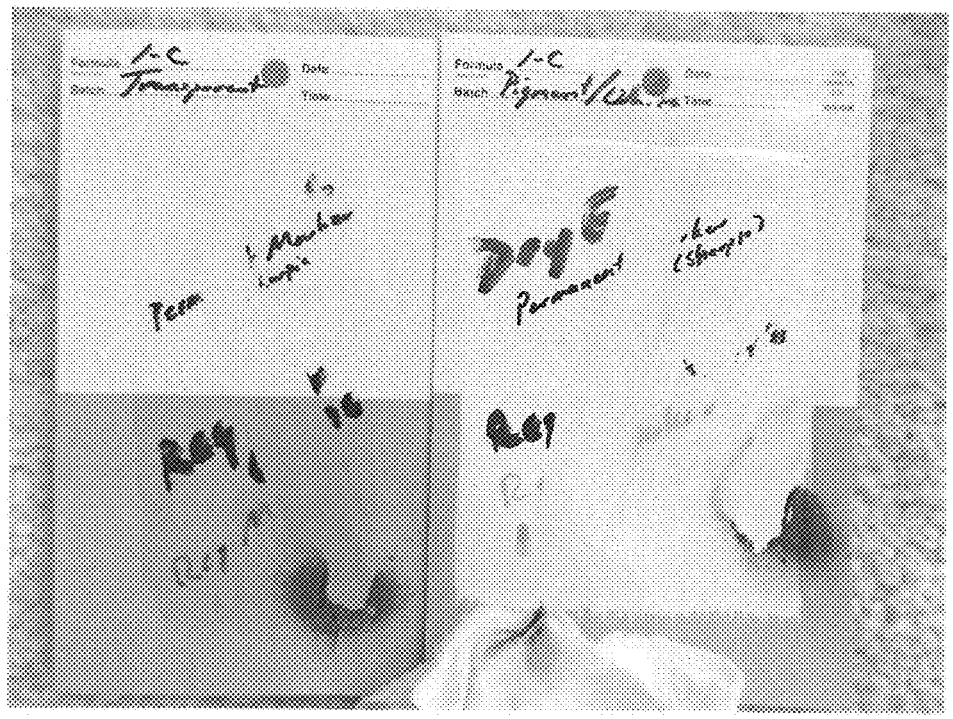
FIG. 9 is a photograph of two test coupons coated with the inventive one-part dry erase coating in Example 7 and then partly removed using a dry paper towel.
Figure 10:
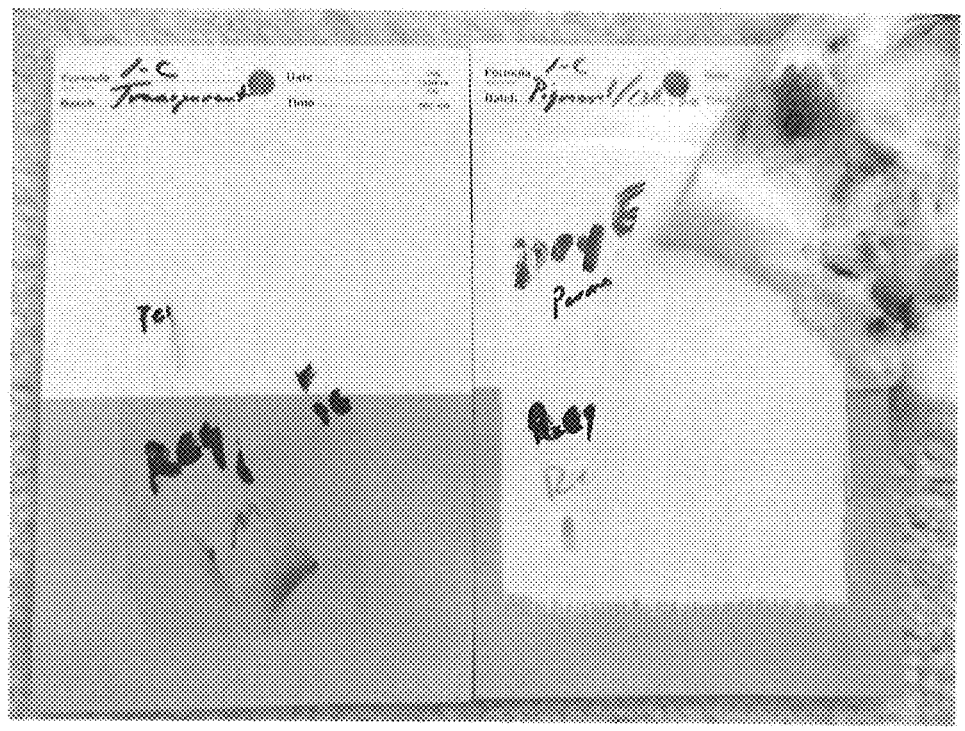
FIG. 10 is a photograph of the two test coupons in FIG. 7, with further removal using isopropyl alcohol (70%), aerosol Goof Off, and Acetone.
Figure 11:
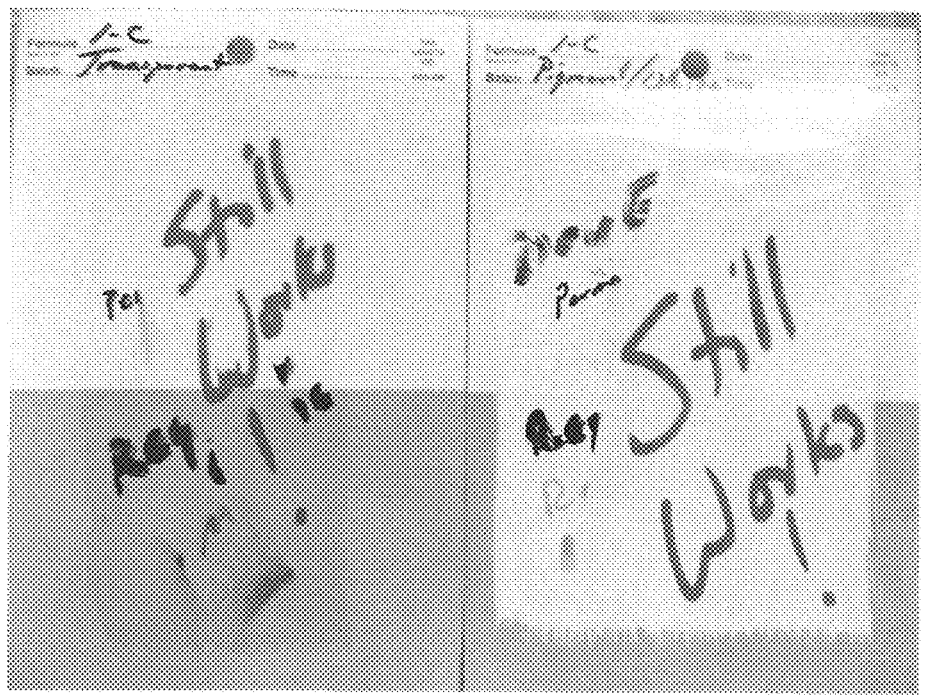
FIG. 11 is a photograph of two test coupons coated with the inventive one-part dry erase coating in FIGS. 7-11 followed by marking the surface with a dry erase marker to demonstrate resistance of the coating to cleaning solvents, and maintenance of the dry erase attributes of the coatings after cleaning.
Figure 12:
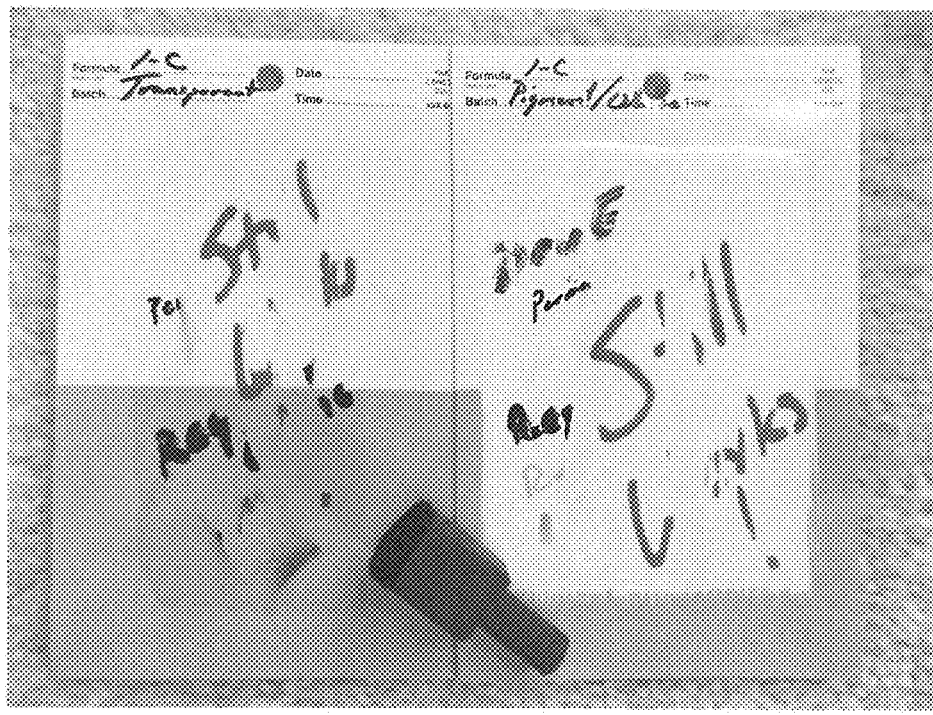
FIG. 12 is a photograph of the test coupons in FIG. 11, showing that the markings can still be dry-erased.

The cured test coupons were marked upon using various writing utensils and markings, which were subsequently removed. The test coupons coated with the dry erase coating (both transparent and white) were first marked on using different writing utensils: dry erase marker (Expo®); low odor dry erase marker (Expo®); permanent marker (Sharpie®); regular, non-permanent marker (RoseArt); Sharpie Accent Highlighter; and a washable marker (Expo®). These results are shown in FIG. 7. FIG. 8 shows removal using a conventional dry eraser, and no solvent. FIG. 9 shows removal of these markings using a dry paper towel, and no solvent. FIG. 10 shows removal of these markings using a solvent. FIG. 11 shows the coupons after removal of markings and cleaning of the dry erase coating using isopropyl alcohol (70%), acetone and Goof Off™ (aerosol can) (from FIG. 10), followed by marking the cleaned surface with a dry erase marker. This demonstrates resistance of the coating to cleaning solvents. FIG. 12 demonstrates that the markings made in FIG. 11 can still be dry erased.

Example 4

Low/Zero VOC, One-Pot Dry Erasable Coatings

One-part, dry erasable coating compositions can be formulated according to the tables below to give compositions have low or zero VOC content, depending upon additives selected.

One-Part Transparent Composition

| RM | Specific Gravity | # In formula (IF) |
|---|---|---|
| Hexane 1,6 Diisocyanate 50% (CAS 822-06-0) Poly (Hexamethylene Diisocyanate) 50% (CAS 28182-81-2) | 1.17 | 90-100 |
| Catalyst[1] | 1.0603 | 0-10 |
| Leveler[2] | 0.904 | 0-.5 |

[1]Curing agent, 4,4'-(Oxydi-2,1-ethanediyl)bismorpholine (CAS 6425-39-4), JEFFCAT® DMDEE, morpholine derivative, available from Huntsman Petrochemical Corporation, Houston, TX.
[2]BYK-085

One-Part White Composition

| RM | Specific Gravity | # In formula (IF) |
|---|---|---|
| Hexane 1,6 Diisocyanate 50% (CAS 822-06-0) Poly (Hexamethylene Diisocyanate 50% (CAS 28182-81-2) | 1.17 | 80-100 |
| Catalyst[1] | 1.0603 | 0-10 |
| Pigment[2] | 4.12 | 1-20 |
| Leveler[3] | 0.904 | 0-.5 |
| Drying agent[4] | 1.06 | 0-2 |

[1]4,4'-(Oxydi-2,1-ethanediyl)bismorpholine (CAS 6425-39-4).
[2]Titanium dioxide.
[3]BYK-085.
[4]PTSI.

What is claimed is:

1. A method of producing a dry erasable surface, said method comprising:
   providing a dry erase composition having a VOC content of less than about 25 g/L, said dry erase composition being selected from the group consisting of:
   a multi-part composition comprising a mixture of a first part and a second part, wherein said first part comprises a curable epoxy resin and said second part comprises an amine curing agent, said multi-part composition comprising greater than about 85% solids by weight; and
   a one-part composition comprising monomers, oligomers, and polymers of an aliphatic or aromatic isocyanate, and an amine curing agent, said one-part composition comprising greater than about 50% solids by weight;
   providing a substrate having a surface;
   forming a coating of said dry erase composition adjacent said substrate surface; and
   allowing said coating to cure under ambient conditions, wherein said cured coating has a surface, said coating surface being markable-erasable.

2. The method of claim 1, wherein said curable epoxy resin is an aromatic epoxide with diglycidyl epoxy functionality.

3. The method of claim 1, wherein said first part consists essentially of said curable epoxy resin.

4. The method of claim 1, wherein said amine curing agent in said multi-part composition is a cycloaliphatic polyamine.

5. The method of claim 1, said second part further comprising a polyamine epoxy adduct.

6. The method of claim 1, wherein said isocyanate is selected from the group consisting of hexamethylene diisocyanate, hexane diisocyanate, toluene diisocyanate, methylene diphenyl diisocyanate, isophorone diisocyanate, and mixtures thereof.

7. The method of claim 1, wherein said amine curing agent in said one-part composition is selected from the group consisting of morpholine, and morpholine derivatives.

8. The method of claim 1, wherein said substrate is selected from the group consisting of wood, Plexiglas, dry wall, painted surfaces, plastic, glass, melamine coatings, metal, slate, porcelain, ceramic, concrete, masonry, woven and nonwoven fabric, enameled surfaces, composites, and combinations thereof.

9. The method of claim 1, wherein said coating is substantially transparent.

10. The method of claim 1, wherein said dry erase composition further comprises a pigment or a dye.

11. The method of claim 1, wherein said cured coating is markable-erasable with dry erase markers and pens, permanent markers, crayons, highlighter markers, washable markers, regular markers, glues, spray paints, make-up, pencils, grease pencils, grease pens, finger paints, and adhesives without a solvent or cleaner.

12. The method of claim 1, wherein said dry erase composition is said multi-part composition, said providing a dry erase composition comprising:
   providing said first part comprising said curable epoxy resin;
   providing said second part comprising said amine curing agent; and
   mixing said first part and said second part to yield said dry erase composition, wherein the weight ratio of curable epoxy resin to amine curing agent in said composition is from about 1:4 to about 4:1.

13. The method of claim 1, further comprising:
   marking said cured dry erase coating surface with a marker, pen, pencil, or paint; and
   removing said marking without the use of water or applied solvents.

14. The method of claim 13, further comprising:
   cleaning said cured dry erase coating surface by contacting with a solvent selected from the group consisting of water, aqueous solutions, isopropyl alcohol, xylene, acetone, ethyleneglycol monohexylether, and mixtures thereof; and
   marking said cleaned dry erase coating surface with a marker, pen, pencil, or paint.

* * * * *